H. G. FISHER.
SIGN DISPLAYING INDICATOR.
APPLICATION FILED JULY 22, 1910.
994,992.
Patented June 13, 1911.
2 SHEETS—SHEET 1.
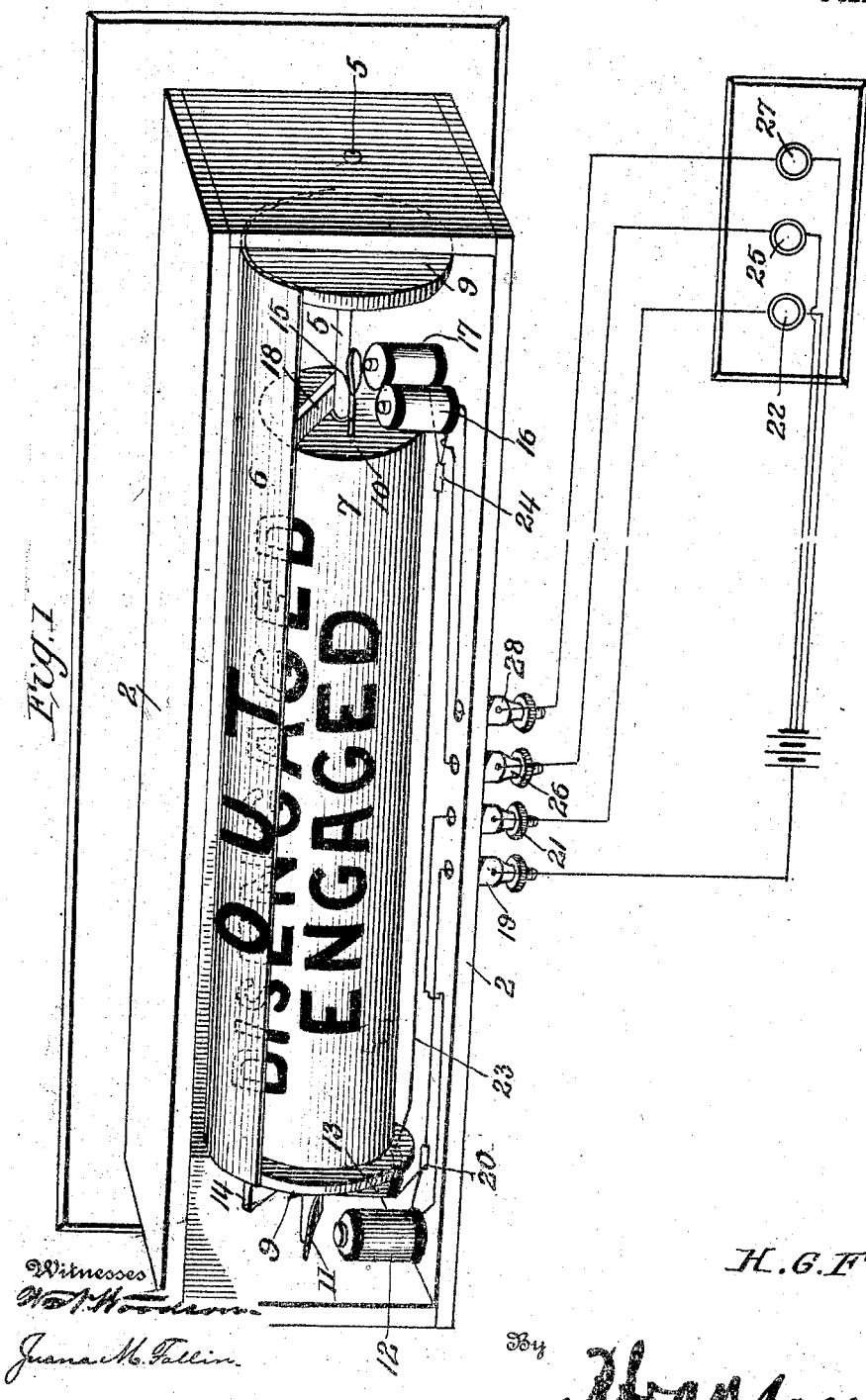
Inventor
H. G. Fisher H. G. FISHER.
SIGN DISPLAYING INDICATOR.
APPLICATION FILED JULY 22, 1910.
994,992.
Patented June 13, 1911.
2 SHEETS—SHEET 2.
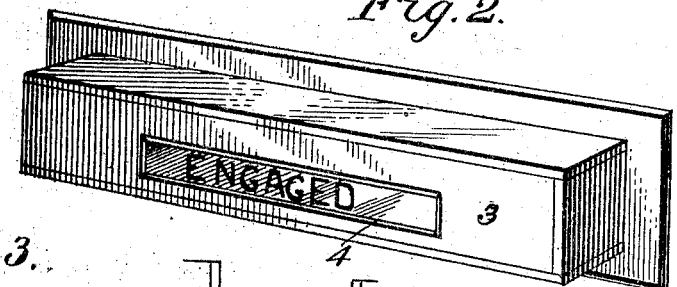
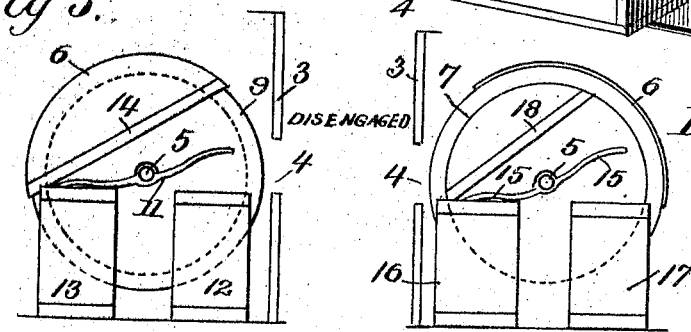
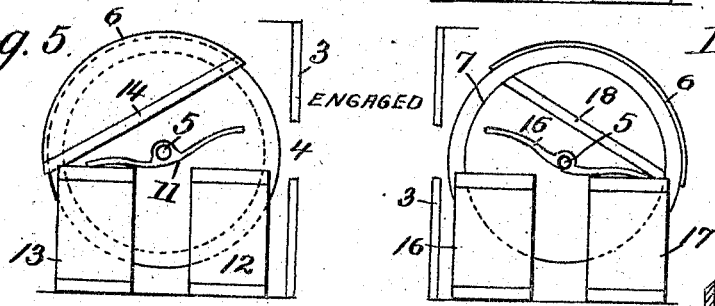
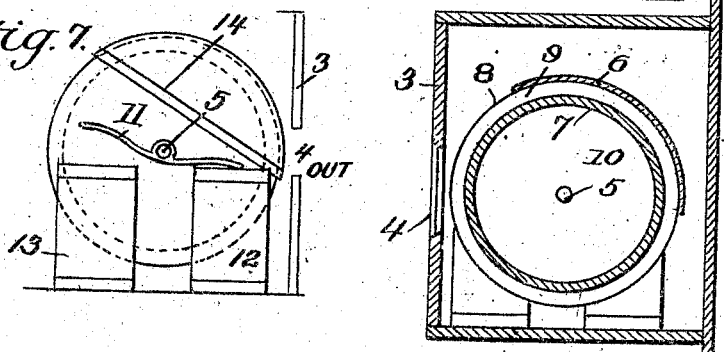
Witnesses
Inventor
H. G. Fisher
By Attorneys ered of Cnada, extending longitudinally thereof is the fixed 60
UNITED STATES PATENT OFFICE.

HENRY G. FISHER, OF NEW DENVER, BRITISH COLUMBIA, CANADA.

SIGN-DISPLAYING INDICATOR.

994,992.  Specification of Letters Patent.  Patented June 13, 1911.

Application filed July 22, 1910. Serial No. 573,256.

*To all whom it may concern:*

Be it known that I, HENRY G. FISHER, subject of the King of Great Britain, residing at New Denver, in the Province of British Columbia and Dominion of Canada, have invented certain new and useful Improvements in Sign-Displaying Indicators, of which the following is a specification.

My invention relates to indicators and particularly to an indicator designed to display any one of certain words or sentences when actuated.

The object of the invention is to provide an indicator of this type adapted to be attached to any convenient support and having a display opening, and provided with means for displaying in the opening the words "Out", "Disengaged" or "Engaged", as may be desired, a further object being to provide a device which is so constructed that after the word "Out" has been displayed, it will be positively moved away from the display opening upon an actuation of the apparatus to display either of the words "Engaged" or "Disengaged".

My invention is shown in the accompanying drawings wherein:

Figure 1 is a perspective view with the face plate removed of my improved indicator, the wiring thereof being shown diagrammatically. Fig. 2 is a perspective view of the indicator, the front plate being in place. Fig. 3 is a diagrammatic end view showing the position of the parts at one end of the indicator when the word "Disengaged" is displayed. Fig. 4 is a like view of the other end of the indicator at the same time. Fig. 5 is a like view to Fig. 3 but showing the parts in the position taken when the word "Engaged" is displayed. Fig. 6 is a like view to Fig. 4 but showing the parts in the position when the word "Engaged" is displayed. Fig. 7 is a like view to Figs. 3 and 5 but showing the position of the parts when the word "Out" is displayed, and the words "Engaged" and "Disengaged" are completely hidden. Fig. 8 is a transverse section through the middle of the device, the parts being in the position to display the word "Engaged".

Referring to these figures, 2 designates a casing of any suitable character, approximately square in section having a face plate rather larger than the casing adapted to be attached to any suitable support, as for instance the door of a room or office. This face plate is designated 3 and is provided with a display opening 4.

Mounted interiorly of the casing 2 and extending longitudinally thereof is the fixed axle 5 upon which the indicating members are mounted. There are two indicating members concentric to each other, the outer member 6 being hollow and inclosing the inner member 7. These members are entirely independent of each other so that one will rotate exteriorly to the other. The outer member 6 has the form of a hollow cylinder, one-half of the cylinder being broken away as at 8, the end of the cylinder being closed by the circular end pieces 9. Preferably, this cylinder is made of very light material such as paper, cardboard or thin sheet metal, the end pieces 9 being relatively heavy to support the semicylindrical shell thus formed. Mounted upon the axle 5 interiorly of the semicylindrical shell 6 is the second indicating member which consists of a cylinder closed at its ends by end pieces 10. This cylinder is preferably made of light material such as paper, cardboard or thin sheet metal which is braced or supported in any suitable manner. It is to be understood that I do not limit myself to any particular construction of the outer indicating member or the inner member, as it is obvious that these might be made in many ways without departing from the spirit of the invention.

The outer member 6 partially incloses the inner member 7 and rotates around said inner member so that when the outer member is in one of its rotated positions it will be interposed between the opening 4 and the inner member so as to shut off a view of the inner member. The outer member is, in this form of my invention, provided with the word "Out" placed upon the shell 6 in such position as to be displayed through the sight opening 4 when the outer member is in operative position. The inner member has placed upon its face the words "Engaged" and "Disengaged", one above the other in such position as to be displayed through the sight opening when the inner member is rotated. It will be obvious that when the inner member is rotated to one position the word "Engaged" will be displayed, when rotated to the other position the word "Disengaged" will be shown; and that when the outer member is rotated neither of the words or indications on the inner member will be displayed, but only the sign upon the outer member. For the purpose of rotating these respective inner and outer sign-carrying members, I have provided a plurality of electro-magnets which electrically engage armatures loose on the shaft 5, which when the magnets are energized are rotated on the shaft in one or the other direction and rotate the outer and inner indicating members in opposite directions.

As a means for actuating the outer rotatable member, I provide the armature 11, which armature has an eye which loosely surrounds the extremity of the shaft 5 and projects in opposite directions, as shown in Fig. 3. Immediately beneath the opposite ends of this armature are located the electro-magnets 12 and 13, the magnets being so placed that when one is energized one end of the armature will be drawn downward and the other end will fly up, and that a reverse action takes place when the other electro-magnet is energized. The adjacent end of the outer sign-displaying member 6 is formed with the transversely extending flange 14 which projects over the armature 11 in position to be engaged by one end or the other of the armature as the armature is rotated or is oscillated by the electro-magnets. This flange 14 acts as a stop and when one end of the armature rises this end will engage the stop and turn the member 6 upon the shaft or axle 5. The shaft 5 at its end opposite the location of the armature 11 is provided with the armature 15. This armature may be either rigidly fastened to the shaft 5 or rotatable therearound as is the armature 11. If the indicating member 7 is fast upon the shaft then the armature 15 must be loose on the shaft. If, however, the indicating member 7 is loose on the shaft the armature may be fast thereon. In other words, it is only necessary that the armature shall work independently of the member 7. The armature 15 extends in opposite directions in precisely the same manner as previously described for the armature 11, and located beneath the ends or wings of the armature are the electro-magnets 16 and 17. When the magnet 16 is energized the forwardly projecting end of the armature will be drawn down and the rearwardly extending end will be raised, and when the magnet 17 is energized the reverse movement takes place. The end of the rotatable member 7 is provided with the transversely extending flange 18 which is of the same construction as the flange 14 previously described, and whose opposite ends are adapted to be alternately engaged by the opposite ends of the armature 15.

Each of the electro-magnets is connected in circuit with a battery or other source of electrical energy and with a push button or other circuit closing mechanism so that when the proper button is depressed the circuit will be closed through the battery and through one or another of the several magnets. The magnets 12 and 13 actuate the outer member 6 to oscillate it from its operative to its inoperative position, and the magnets 16 and 17 operate the inner rotatable member. A common return wire from a battery is attached to the binding screw 19 from which a connection extends which is divided at 20 and passes to both of the electro-magnets 12 and 13. A feed wire for the magnet 12 passes outward to the binding post 21, from thence to a button 22 and thence to the battery, while a wire 23 extends from the magnet 13 transversely through the casing and is connected at 24 with both of the magnets 16 and 17. A wire from the battery is connected to the button 25, the binding post 26 and thence passes to the coil of the magnet 17. The wire from the magnet 17 is connected to the wire 23 leading to the magnet 13. A wire from the battery also passes to the push button 27, thence to the binding post 28, and thence to the coil of the magnet 16, the current being carried by the wire 24 and the wire 23 to the electro-magnet 13, and thence back through the binding post 19 to the battery.

It will be seen that three buttons are provided which when depressed will close the circuit through any one of the electro-magnets 12, 16 and 17, and that when either of the electro-magnets 16 or 17 are energized that the electro-magnet 13 will also be energized. When the button 22 is depressed, the parts being in the position shown in Figs. 3 and 4, the electro-magnet 12 will be energized. This will draw downward upon the forwardly projecting end of the armature 11, and the rear end of the armature will engage the flange or stop 14 so as to rotate the outer member 6 into such position that the word "Out" will be displayed through the opening 4. When it is desired to hide the word "Out" and to display either of the words "Engaged" or "Disengaged" either of the buttons 25 or 27 are operated. If the button 27 is operated it will cause the forwardly projecting end of the armature 15 to be depressed, thus causing the rear end of the armature to engage the stop or flange 18 and thus rotating the member 7 so that the word "Disengaged" is shown through the opening. The closing of the circuit through the magnet 16 at the same time closes the circuit through the magnet 13 and hence as the inner member is rotated in one direction the outer member will be rotated in the reverse direction so as to hide the word "Out." If the push button 25 is operated then the magnet 17 will be energized drawing down the rearwardly projecting end of the armature 15, whereupon the forward end of the armature will engage the flange 18 and rotate the inner member to such position that the word "Engaged" will be displayed.

While I have shown my indicator as being applied to the display of specific signs, it will of course be understood that the apparatus might be used for any analogous purpose without departing from the spirit of the invention, and that it would be quite possible to extend the principle of my invention to the use of a plurality of rotatable sign-carrying members concentric with each other and each displaying a proper sign.

I do not wish to be limited to the details of the construction as shown in the accompanying drawings as many modifications might be made without departing from the aforesaid principle.

What I claim is:

1. An indicator including an outer and an inner rotatably mounted sign-displaying member, one concentric to the other, and means for independently moving either member into position to display its sign and for automatically moving the outer member out of such position upon a movement of the inner member to said display position.

2. An indicator including a plurality of rotatably mounted independently movable sign-displaying members, a pair of electro-magnets operating each member, one magnet of each pair when energized being adapted to move the member to a sign-displaying position and the other to a sign-concealing position, circuit closers for each magnet, a battery in circuit with the circuit closers and said magnets, and armatures actuated by the electro-magnets when energized and acting to rotate the sign-displaying members into or out of their displayed position.

3. An indicator including a plurality of rotatably mounted independently movable sign-displaying members, a pair of electro-magnets for operating each member, circuit closers, a battery connected with the circuit closers and said magnets, armatures each pivoted at its middle, and means on the sign-displaying members adapted to be engaged by the opposite ends of each armature, whereby when one or the other of the magnets is energized the armature will be actuated to rotate the sign-displaying member.

4. An indicator including a plurality of rotatably mounted independently movable sign-displaying members, a pair of electro-magnets for each member mounted on opposite sides of the pivotal axis of said member, a pivoted armature for each of the rotatable members, the opposite ends of the armature each extending over one of said magnets, means for energizing any one of said magnets, and stops projecting from the rotatable members engageable by the opposite ends of each armature, whereby when the armature is oscillated the corresponding sign-displaying member will be rotated in one or the other direction.

5. An indicator including a casing having a sight opening, a shaft passing longitudinally through the casing, an inner rotatable member mounted upon the shaft, an outer rotatable member also mounted upon the shaft and concentric to the inner rotatable member, said outer member having a portion of its face cut away, a transversely extending flange at one end of the inner member, a transversely extending flange on one end of the outer member, a pair of electro-magnets for each of said members mounted one on each side of the shaft, circuit closers for controlling said electro-magnets, a battery connected in circuit with the circuit closers and the magnets, an armature for each of the rotatable members, each armature being mounted at its middle upon the shaft, the ends of each of the armatures being adapted to engage with the transverse flange on the end of the corresponding rotatable member, said armatures being mounted with their ends projecting over each of the corresponding magnets.

6. An indicator including a longitudinally extending shaft, a cylindrical rotatable sign-displaying member rotatably mounted on the shaft, a hollow semicylindrical rotatable member also mounted on the shaft and partially surrounding the inner rotatable member, a pair of magnets disposed one on each side of the said shaft and located at the end of the outer rotatable member, an armature pivoted at its middle to said shaft and having its ends projecting over the poles of said magnets, a transversely extending flange on the end of the outer member with which the ends of the armature engage when the armature is actuated by the electro-magnets, a pair of electro-magnets mounted adjacent to the end of the inner rotatable member and one on each side of the axis thereof, an armature pivotally mounted at its middle upon said shaft and having its opposite ends extending over said last named electro-magnets, a transverse flange on the adjacent end of the rotatable member with which the ends of said armature engage when the magnets are energized, a battery, a connection from the battery to both of the first named magnets, a push button, a connection from said push button to one of said first named magnets, a connection from the other magnet to the pair of said last named magnets, push buttons, connections from each push button respectively to one of said last named electro-magnets.

7. An indicator including outer and inner rotatably mounted sign-displaying members, one concentric to the other, pivoted armatures, one for each of the sign-displaying members, said armatures being oscillatable, means for engaging the armatures with the sign-displaying members, and electro-magnetic means for oscillating said armatures to rotate the outer and inner members into or out of a displayed position.

In testimony whereof I affix my signature in presence of two witnesses.

HENRY G. FISHER. [L. S.]

Witnesses:
R. W. MANSFIELD,
GEO. WILLIAMSON.